United States Patent Office 3,639,436
Patented Feb. 1, 1972

3,639,436
OMEGA, OMEGA-DINITROALKANOIC ACIDS, ESTERS, AND ESTER-SALTS
Hans D. Holtz, Bartlesville, Okla., assignor to Phillips Petroleum Company
No Drawing. Filed Dec. 11, 1967, Ser. No. 689,302
Int. Cl. C09f 7/00
U.S. Cl. 260—404.5
2 Claims

ABSTRACT OF THE DISCLOSURE

Novel compounds, omega,omega-dinitroalkanoic acids are prepared by initially reacting certain oxygen-containing cycloalkane derivatives with aqueous nitric acid in the presence of a catalyst composition, such as ammonium vanadate (V), having one or more metallic elements selected from Sc, Ti, V, Cr, Mn, Fe, Co, Ni, Cu, Y, La, Ce, Pr, Nd, and Sm, preferably V and Cu, and recovering the desired novel acids from the reaction product. Novel esters and alkali metal salts of these esters can be prepared from the novel acids by suitable reactions. The novel acids and derivatives thereof are useful intermediates for the production of omega-amino acids which are useful in the synthesis of polyamide polymers, such as nylon 12.

---

This invention relates to novel omega,omega-dinitroalkanoic acids, derivatives thereof, and a process for making same.

I have found that novel and useful compounds having the general formula:

$$\begin{array}{c} NO_2 \qquad\qquad O \\ | \qquad\qquad\qquad \| \\ X-C-(CR'_2)_n-CH_2-C-C-O-R \\ | \\ NO_2 \end{array}$$

where $n$ is an integer in the range of 7 to 11, preferably 9; X is an alkali metal or H; R is H, alkyl, cycloalkyl, aryl, or combinations thereof having 1 through 12 carbon atoms when X is H; R is alkyl, cycloalkyl, aryl, or combinations thereof having 1 through 12 carbon atoms when X is an alkali metal; and R' is H or alkyl having 1 through 8 carbon atoms with the total number of carbon atoms in all R' groups per molecule being 16 or less; can be prepared by reacting certain oxygen-containing cycloalkane derivatives with aqueous nitric acid in the presence of a catalyst composition having at least one element selected from the group consisting of Sc, Ti, V, Cr, Mn, Fe, Co, Ni, Cu, Y, La, Ce, Pr, Nd, and Sm, preferably having V or Cu, such as ammonium vanadate (V). The desired compound within the scope of this general formula can be recovered or prepared from the reaction mixture in a variety of ways.

Thes novel compounds have particular utility as intermediates in preparation of omega-amino acids which are well known to be useful in the preparation of polyamide polymers, such as nylon, which have well known utility in the fabrication of synthetic fibers, molded articles, and the like.

The oxygen-containing cycloalkane derivatives which are used to produce the novel compounds of this invention include monohydroxy-substituted cycloalkanes (cycloalkanols), oxo-substituted cycloalkanes (cycloalkanones), alkoxy-substituted cycloalkanes, nitrito-substituted cycloalkanes, and nitrato-substituted cycloalkanes which are represented by the general formulas:

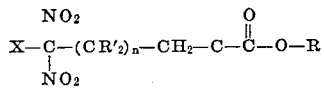

where $n$ is an integer in the range of 7 to 11, preferably 9; Y is (OR″), (ONO), or (ONO$_2$) with R″ being H or alkyl containing 1 through 6 carbon atoms; and R′ is H or alkyl having 1 through 8 carbon atoms with the total number of carbon atoms in all R′ groups per molecule being 16 or less.

Representative examples of these oxygen-containing cycloalkane derivatives include: cyclododecanol, cyclodecanol, cyclotetradecanol, cyclododecanone, 4-butyl-cyclododecanone, ethoxy-4-methylcyclododecane, hexoxy-4,8-diethylcyclododecane, nitritocyclododecane, nitratocyclododecane, nitratocyclodecane, nitratocyclotetradecane, methoxycyclododecane, hexoxycyclododecane, pentoxycycloundecane, propoxycyclotridecane, 3,4,8-trimethyl - 6 - pentyl-7-octylcyclododecanol, 4,6-dihexylcyclododecanone, methoxy-4-propylcyclodecane, nititro - 3,6 - di-(2 - ethylhexyl)cyclododecane, nitrato-4,5-dioctylcyclododecane, 3,5 - dioctylcyclotetradecanone, hexoxy-4,6-di(4-methylheptyl)cyclododecane, and the like.

The catalyst employed in this invention can have one or more compounds of a metal from Sc, Ti, V, Cr, Mn, Fe, Co, Ni, Cu, Y, La, Ce, Pr, Nd, and Sm. Preferably, at least one compound of copper and/or vanadium is employed. An example of a compound that is particularly applicable to this invention is ammonium vanadate (V), NH$_4$VO$_3$. Conventional supports which are substantially inert with respect to the catalyst compound in the reaction environment can be employed if desired. Representative examples of these supports are silicas, alumina, beryllia, carbon, diatomaceous earth, magnesia, zeolites, and the like. Any commercial grade of nitric acid can be used to prepare aqueous nitric acid solution suitable for the process of this invention including fuming nitric acid. The concentration of nitric acid in the solution should generally be in the range of about 10 to 90 weight percent, preferably 25 to 75 weight percent.

The process can be carried out in a wide variety of ways. It can be carried out in conventional reactors, in a batch or continuous operation, and with or without the use of an inert organic diluent as the reaction medium. Any inert organic diluent such as hexane, benzene, and the like, can be used.

The selection of the temperature and pressure to be used for the reaction will depend upon the activity of the catalyst system being used, the diluent used, etc. In general, the reaction can be carried out at temperatures in the range of 20 to 100° C., preferably 40 to 70° C. Atmospheric or autogenous pressures are preferably employed because of convenience; however, pressures in the range of 0.5 to 5 atmospheres can be employed. The reaction time can be optimized for the operating conditions being used to effect the desired degree of conversion. In general, reaction times in the range of 10 minutes to 4 hours are most suitable.

The amount of catalyst used can be in the range of 0.001 and 0.1 mole of catalyst element per mole of the substituted cycloalkane. Sufficient nitric acid should be used to provide at least 2 moles of nitric acid for each mole of substituted cycloalkane feed, e.g., in the range of 2 to 200 moles of nitric acid per mole of substituted cycloalkane. Normally, use of a considerable excess over the equivalent amount of nitric acid is preferred because nitric acid is normally cheaper than the substituted cycloalkane feeds. Employment of an excess of the nitric acid to favor production of the desired reaction products in accordance with the law of mass action normally provides a less costly operation. Preferably, the substituted cycloalkane feed should be charged to the reactor prior to charging the nitric acid, or both reactants should be charged substantially concurrently to minimize formation of dicarboxylic acids.

Omega,omega-dinitroalkanoic acid can be separated from the reaction effluent by a variety of well known techniques. An example of a presently preferred method of separation is: (A) reacting the omega,omega-dinitroalkanoic acid component of the reaction effluent with an alcohol or phenol, preferably in the presence of $H_2SO_4$ or other dehydrating agent to form an omega,omega-dinitroalkanoate, (B) reacting the thus esterified compound with an aqueous solution of an alkali metal hydroxide to form and precipitate an alkali metal salt of the omega,omega-dinitroalkanoate, (C) separating the thus formed salt from other materials by means of one or more selective solvents, (D) reconstituting the omega,omega-dinitroalkanoate from the separated salt by contacting the separated salt with an acid, such as HCl, to replace the alkali metal ions with hydrogen ions and (E) hydrolyzing the omega,omega-dinitroalkanoate with steam to recover the omega,omega-dinitroalkanoic acid.

The alcohol or phenol is contacted with the reaction mixture in an amount which provides at least one mole of alcohol or phenol per mole of the substituted cycloalkane employed as feed, an excess of alcohol or phenol being preferred. In general, 1 to 50 moles of alcohol or phenol for each mole of substituted cycloalkane is used. Any alcohol or phenol which will react with the carboxy moieties and form an ester is acceptable. The aqueous solution of alkali metal hydroxide is contacted with the esterified mixture in an amount sufficient to neutralize said mixture. Generally, 1 to 50 moles of the alkali metal hydroxide for each mole of the substituted cycloalkane feed is used. The term "alkali metal hydroxide" as employed herein is used to designate the group comprising lithium, sodium, potassium, rubidium, cesium, and francium hydroxides.

The novel alkali metal salts of the omega,omega-dinitroalkanoates of this invention can be prepared by merely stopping as step (C) of the above-described method for separating omega,omega-dinitroalkanoic acids from the reaction effluent.

The novel esters of the invention can be produced by contacting the reaction effluent with an alcohol or phenol having 1 to 10 carbon atoms per molecule in the manner and quantity described above (Step A) and recovering the ester from the mixture by conventional separation techniques, such as solvent extraction.

The process for the preparation of the novel acids and derivatives thereof of this invention can be best described by the following reactions:

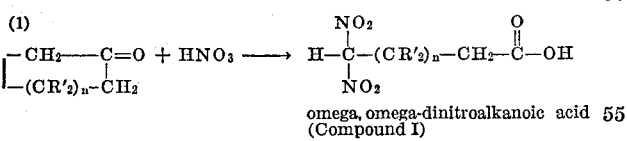

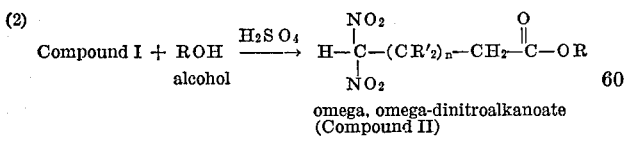

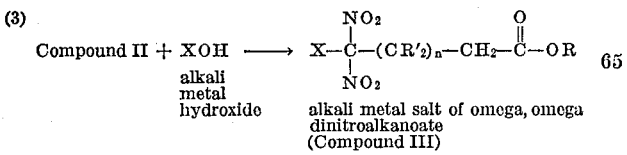

As described above the omega,omega-dinitroalkanoic acid can be reconstituted from compound III of reaction (3) in accordance with the following reactions:

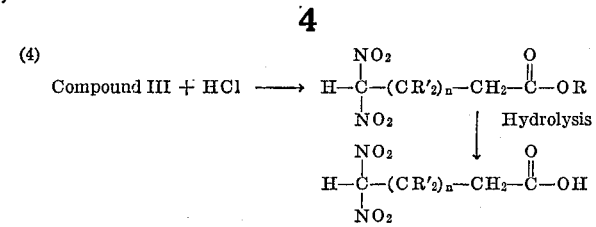

The novel compounds of this invention are useful intermediates for the production of omega-amino acids which are useful in the synthesis of polyamide polymers, such as nylon 12. An omega,omega-dinitroalkanoic acid can be esterified to form an omega,omega-dinitroalkanoate which is contacted with an aqueous solution of an alkali metal hydroxide to form an alkali metal salt of the omega,omega-dinitroalkanoate. Hydrogenation of that salt produces an omega-aminoalkanoic acid which can be used in the preparation of polyamide polymers of known utility, e.g., nylon 12, by well known polycondensation techniques. The novel omega,omega-dinitroalkanoic acids of this invention can be converted to omega-aminoalkanoic acids by forming alkali metal salts thereof, as described above, and then subjecting the salts of to hydrogenation. The novel alkali metal salts of omega,omega-dinitroalkanoates of this invention can be converted to omega-aminoalkanoates by hydrogenation.

The following examples are presented to further illustrate this invention and are not to be construed as limiting same thereto.

EXAMPLE I

Twenty-five grams of cyclododecanol was charged initially to a reactor, and one gram of $NH_4VO_3$ dissolved in 200 ml. of $HNO_3$ having a concentration of 50 weight percent was subsequently added. The materials were reacted at atmospheric pressure for 15 minutes at a temperature initially at 55° C. which was increased to 70° C. The reaction mixture was then poured into 200 ml. of ice water, filtered, and the precipitate washed with cold water. The residue which weighed 31 grams was then dried and charged to a reactor with 200 ml. of benzene, 200 ml. of ethanol, and 10 ml. of concentrated sulfuric acid. After this mixture was refluxed for 6 hours, 500 ml. of water was added, and 35.4 grams of product was extracted with benzene. This product was dissolved in cylclohexane at a temperature of 0 to 10° C. and treated with a solution of KOH in ethanol at a temperature of 0 to 10° C. until precipitation was substantially complete. The precipitate was filtered, washed with cyclohexane-ethanol solution at a temperature of 0 to 10° C., and dried. The precipitate, potassium ethyl 12,12-dinitrododecanoate, weighed 8.3 grams which is equivalent to a yield of 17 percent, e.g., moles of product (100)/moles of feed.

EXAMPLE II

Twenty-five grams of cyclododecanone was chargred initially to a reactor, and one gram of $NH_4VO_3$ dissolved in 200 ml. of $HNO_3$ having a concentration of 50 weight percent was added subsequently. The reaction mixture was heated for 1.5 hours at 55° C. and was subsequently treated for product recovery in the same manner as described in Example I. The precipitate, potassium ethyl 12,12 - dinitrododecanoate, weighed 12.3 grams which is equivalent to a yield of 25 percent, e.g., moles of product (100)/moles of feed.

EXAMPLE III

Elemental analyses were performed on samples of the precipitate prepared in Examples I and II. The precipitate was found to be comprised substantially of

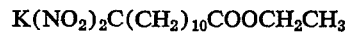

according to the following results.

Calculated theoretical (percent): C, 47.1; H, 7.06; N, 7.83. Experimentally determined (percent): C, 47.0; H, 7.0; N, 7.6.

Infrared and ultraviolet analysis of another portion of the precipitate prepared in Examples I and II produced results consistent with the above elemental analysis. The precipitate was heated to determine its melting point, and it was found to decompose at 150° C.

EXAMPLE IV

Samples of the precipitate prepared in Examples I and II were treated with an excess of water and hydrochloric acid to form a clear liquid which was extracted with chloroform. The chloroform extracts were dried over $CaSO_4$, filtered and evaporated to dryness. Elemental analyses performed on the dried products showed that they were identical and that they were ethyl 12,12-dinitrododecanoate according to the following results.

Calculated theoretical (percent): C, 52.8; H, 8.2; N, 8.8. Experimentally determined (percent): C, 52.7; H, 8.4; N, 8.5.

A nuclear magnetic resonance (NMR) analysis was also performed on the dried products with a nuclear magnetic resonance specialties Varian A–60 instrument. The operating conditions for this analysis were as follows:

Temperature _____ 33° C.
Solvent _____ None
Standard _____ $Me_4Si$

An analysis of the NMR spectrum of the material revealed the following characteristics of the material:

| C–H designation [1] (see structure below) | 1 | 4 | 2 | 3 |
|---|---|---|---|---|
| Tau | 3.4 | 5.9 | 7.3-8 | 8.4-9 |
| Effect | Triplet | Quadruplet | Multiplet | |
| Integrated area (predicted) | 1 | 2 | 4 | 19 |
| Integrated area (from spectrum) | 1 | 2 | 5 | 20 |

[1] The C–H designation is for the different types of bonds as identified numerically in the structure:

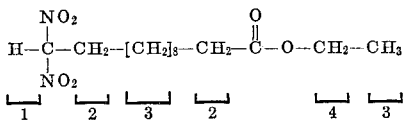

As can be seen from the above analysis of the NMR spectrum, the data are consistent with the structure of ethyl 12,12-dinitrododecanoate, especially the triplet at 3.4 tau and the correlation of the predicted and actual integrated areas.

EXAMPLE V

A 2.0 gram sample of the precipitate prepared in Examples I and II, identified as potassium ethyl 12,12-dinitrododecanoate, was dissolved in 100 ml. of acetic acid and hydrogenated in the presence of 0.2 gram of $PtO_2$. The hydrogen uptake was rapid. Hydrogen was pressurized initially to 34 p.s.i.g., and the pressure dropped to 10 p.s.i.g. in 7 minutes. Hydrogen was then pressurized to 31 p.s.i.g. and the pressure dropped to 24 p.s.i.g. in 60 minutes. The total hydrogen uptake was 0.87 liter or $3.9 \times 10^{-2}$ moles. The potassium ethyl 12,12-dinitrododecanoate charge was $0.56 \times 10^{-2}$ moles. Thus, a stoichiometric amount of hydrogen was reacted in accordance with the following reaction:

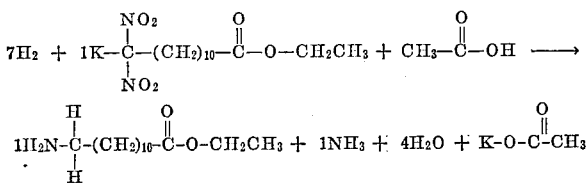

The run was repeated with 4.0 grams of the precipitate prepared in Examples I and II, 100 ml. acetic acid, 0.2 gram $PtO_2$ and hydrogen at 60 p.s.i.g. being charged to a hydrogenation reactor. The reaction was carried out for 30 minutes. The reaction mixture was filtered and solvent removed. The residue was heated to boiling in the presence of 100 ml. of ethanol, 100 ml. of water, and sufficient KOH to produce a pH of 12. The hydrogenation product was cooled, solvent was removed, 75 ml. of water was added, and sufficient HCl was added to effect a pH of 8. The precipitate formed at this lower pH was filtered and recrystallized from an ethanol-water mixture. The amount of dried material, 12-aminododecanoic acid, recovered was 1.3 grams.

The melting point of the recovered material was found to be 181–183° C. which compares very closely to the literature value for 12-aminododecanoic acid of 183–184° C. Elemental analyses of the dried material gave the following results.

Calculated theoretical (percent): C, 67.1; H, 11.7; N, 6.5. Experimentally determined (percent): C, 66.8; H, 11.9; N, 6.5.

Spectrographic analysis of the dried material produced data consistent with the above amino acid structure.

The 1.3 grams of 12-aminodecanoic acid product corresponds to a yield of 54 mole percent based upon the amount of potassium ethyl 12,12-dinitrododecanoate charged to the reactor.

From the data presented in the foregoing examples, it is readily evident that the stated structures for novel compositions produced in accordance with this invention are correct. It is also evident from the data presented in Example IV that the novel compositions of this invention can be used for the preparation of omega-aminoalkanoic acids which are known intermediates for the preparation of nylons.

As will be evident to those skilled in the art, various modifications can be made in this invention without departing from the spirit or scope thereof.

I claim:
1. A compound having the general formula

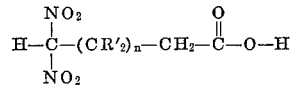

wherein $n$ is an integer in the range of 7 to 11 and $R'$ is hydrogen or an alkyl having 1 through 8 carbon atoms.

2. A compound according to claim 1 wherein $R'$ is hydrogen and $n$ is 9.

References Cited

UNITED STATES PATENTS

| 2,557,282 | 6/1951 | Hamblet et al. | 260—531 |
| 2,881,215 | 4/1959 | Godt, Jr. | 260—534 |
| 3,290,367 | 12/1966 | White et al. | 260—531 |

OTHER REFERENCES

Feuer et al. I, "The Vibration of Cyclic etc." (1956), JACS 78, pp. 4364–67 (1956).

Feuer et al. II, "The Alkyl Vibration etc." (1966), J. Org. Chem. 31, pp. 3152–58 (1966).

Gut et al., "The Oxidative Cleavage etc." (1965), Chimia 19, pp. 581–84 (1965).

Lubyanitskii, "Optical Temp. of Oxide of Cyclohexanol etc." (1963), CA 59, p. 6268 (1963).

Van Asselt et al., "The Prep. of Adipic Acid etc." (1963), CA 59, p. 1472 (1963).

Badische Anilin, "Aliphatic Aldehydo Carbox. Acids," (1952), CA 48, p. 7054 (1954).

Goldman et al., "Mech. of Catalysis of the Oxide, etc. (1964), CA 61, p. 10556 (1964).

LEWIS GOTTS, Primary Examiner

G. HOLLRAH, Assistant Examiner

U.S. Cl. X.R.

260—404